United States Patent [19]

Carey et al.

[11] Patent Number: 5,111,350
[45] Date of Patent: May 5, 1992

[54] SHUTTER OPENING APPARATUS FOR AN INFORMATION STORAGE DISK DRIVE SYSTEM

[75] Inventors: James R. Carey; David L. Rowden, both of Rochester, N.Y.

[73] Assignee: Literal Corporation, Colorado Springs, Colo.

[21] Appl. No.: 622,173

[22] Filed: Dec. 4, 1990

Related U.S. Application Data

[63] Continuation of Ser. No. 329,474, Mar. 28, 1989, abandoned.

[51] Int. Cl.⁵ ............................................. G11B 17/04
[52] U.S. Cl. ............................. 360/99.06; 360/97.01; 369/291
[58] Field of Search ............... 360/97.01, 98.04, 99.08, 360/99.12, 99.06, 133; 369/291

[56] References Cited

U.S. PATENT DOCUMENTS

| | | | |
|---|---|---|---|
| 4,546,397 | 10/1985 | Asami et al. | 360/133 X |
| 4,622,607 | 11/1986 | Smith, II | 360/99.12 |
| 4,688,206 | 8/1987 | Nakagawa et al. | 369/291 |
| 4,747,001 | 5/1988 | Kokubo et al. | 360/98.04 |
| 4,791,511 | 12/1988 | Davis | 369/291 |
| 4,823,214 | 4/1989 | Davis | 369/291 X |
| 4,876,619 | 10/1989 | Suzuki | 360/97.01 |

Primary Examiner—John H. Wolff

[57] ABSTRACT

In an information disk drive system, a pivoted shutter opening lever is positioned in a cartridge receiving guide in the same plane as the disk in the cartridge. The lever is mounted on a movable pivot with a shutter engaging member positioned to begin opening the cartridge shutter to expose a segment of disk recording tracks only after the segment is inside the disk drive and to complete opening of the shutter at an intermediate stage of cartridge insertion to allow nesting of disk access components within the disk access opening in the cartridge prior to the cartridge reaching its final operating position. Interference between the opening lever and the fully opened shutter during final travel of the cartridge is avoided by a mechanism which moves the lever pivot by a sufficient amount to allow the shutter engaging member to translate in a straight line parallel to the insertion path of the cartridge during final insertion motion of the cartridge. Two embodiments of the pivot moving mechanism are shown.

12 Claims, 6 Drawing Sheets

SHUTTER OPENING APPARATUS FOR AN INFORMATION STORAGE DISK DRIVE SYSTEM

This is a continuation of application Ser. No. 07/329,474 filed on Mar. 28, 1989, abandoned as of the date of this application.

FIELD OF THE INVENTION

This invention relates to information storage disk drive systems and more particularly to disk cartridge shutter opening apparatus for such systems.

BACKGROUND OF THE INVENTION

It is well known to protect an information storage disk from dust and other contamination by enclosing it in a protective, rigid or semi-rigid cartridge shell which is provided with a movable shutter biased to normally close a disk access opening formed in the shell. A shutter opening mechanism is generally provided in the disk drive system to open the shutter automatically as the cartridge is inserted so as to allow access of a read/write head to the disk.

In general, such opening mechanisms may include one or more members positioned inside the drive which contact the shutter as the cartridge is inserted longitudinally into the drive and force the shutter to move laterally to expose the disk access opening. In the case of flexible magnetic disk cartridges, the magnetic read/write heads are typically held pivoted away from the plane of the disk until the cartridge is fully inserted with the shutter open and the disk exposed whereupon the heads are brought into contact with the disk. Since magnetic read/write heads are relatively small and the width of the radial band traversed by the scanning heads is generally relatively narrow, the cartridge access opening can be correspondingly narrow and the disk can be adequately exposed with relatively short lateral movement of the shutter.

With the advent of optical and magneto-optical information storage technology, read/write heads have become more bulky in order to accommodate the optical components required to generate the laser beam which is focused onto the disk surface for read and/or write functions. Moreover, for good signal-to-noise performance, the head with its beam objective lens must be maintained quite close to the surface of the disk, usually within 1-2 millimeters, as the head scans across the information storage tracks. This requires that the disk access opening in the cartridge be larger than is used for magnetic disk cartridges. Additionally, in the case of magneto-optical systems, a relatively large access opening in the cartridge also must be provided to allow an electromagnetic bias coil to be maintained in similar close proximity to the disk surface on which the magneto-optical media resides for effective operation during the write function. In addition to providing for access by the head objective lens and bias coil, it is also necessary in some cases to provide for access by a disk clamp mechanism used to clamp a central hub region of the disk to a spindle-drive. Such a clamp is typically located on the opposite side of the disk from the spindle-drive.

It is typically very important to minimize the volume taken up by the cartridge loading and unloading mechanism in disk drive systems, particularly for mini and microcomputer applications. An effective way to accomplish this objective is to maintain the cartridge and its enclosed disk in an operating position within the drive system that is in the same plane as the cartridge insertion plane with the drive-spindle, disk clamp and bias coil being brought into operating position with the disk after the cartridge is in its fully inserted position.

In order to maintain the optical read/write head and the bias coil and disk clamp in proper spaced relationship from the surface of the disk with a minimum of costly mechanical design complexity, it is highly desirable that these elements remain fixed in the axial direction relative to the disk surfaces and thus become nested within the disk access opening as the cartridge is inserted longitudinally into the disk drive system. This requires not only that the disk access opening be wide enough from the leading edge to as far as the central hub to accommodate these elements, but also that the shutter be fully opened before these elements are encountered during insertion. A further consideration is the desire to have the shutter maintained in the closed position covering the disk access opening until the cartridge has been inserted far enough into the drive system that at least the track area, and preferably also the central hub region of the disk, be protected by the drive system from accidental contact by the user when the shutter begins to open. As a consequence, the shutter must opened very quickly over a very short span of cartridge insertion travel in order to clear the read/write and disk clamp elements while at the same time protecting the disk surfaces from accidental contact by the user during insertion.

It is therefore an object of the present invention to provide a shutter opening mechanism for an information storage disk drive system that is low in cost and is capable of rapidly opening the shutter over a short span of cartridge insertion travel.

SUMMARY OF THE INVENTION

In accordance with the invention, therefore, shutter opening apparatus is provided in an information storage disk drive system of the type having a cartridge insertion guide means for receiving a disk cartridge along an insertion path and for holding the cartridge in its own plane of insertion when in a final operative position. The cartridge contemplated by the invention is provided with a shutter movable laterally of the cartridge insertion direction to uncover a disk access aperture in the cartridge which exposes a radial segment of recording tracks on the disk. In the disk drive system one or more of optical read/write head, electromagnetic bias coil and disk hub clamp components are positioned within the guide means in the cartridge insertion path and are adapted to be nested in the access aperture when the cartridge is in its final operative position. With this in mind, the shutter opening apparatus of the invention comprises a pivotable shutter opening lever positioned in the guide means, the lever having a shutter engaging member adapted to engage the shutter when the cartridge has been inserted to a point at which at least the disk recording track segment is substantially within said guide means and further adapted to pivot laterally and open the shutter sufficiently by a point along said insertion path at which the cartridge encounters any of the head, clamp or coil components in the guide means whereby the shutter clears the components and allows the components to nest within the access aperture as the cartridge is continued to be inserted toward its final operative position.

According to a preferred form of the invention, the shutter opening apparatus includes a movable pivot, the shutter opening lever being mounted on the pivot and the pivot being adapted to be moved in a predetermined direction when the shutter is fully opened to allow the shutter engaging member on the lever to translate along a linear path parallel to the insertion path of the cartridge whenever the cartridge translates in either direction along the insertion path beyond the point in the path at which the shutter is fully opened.

In a particularly preferred form of the invention, the movable pivot is mounted on a pivotable mounting arm and there is included means, operative as the cartridge moves along the insertion path with the shutter fully open, for causing the movable pivot to translate in a lateral direction opposite to the lateral opening direction of the shutter by an amount sufficient to permit continued pivoting of the shutter opening lever as the shutter engaging member translates along a linear path parallel with the direction of movement of the cartridge.

DETAILED DESCRIPTION

Figure 1:
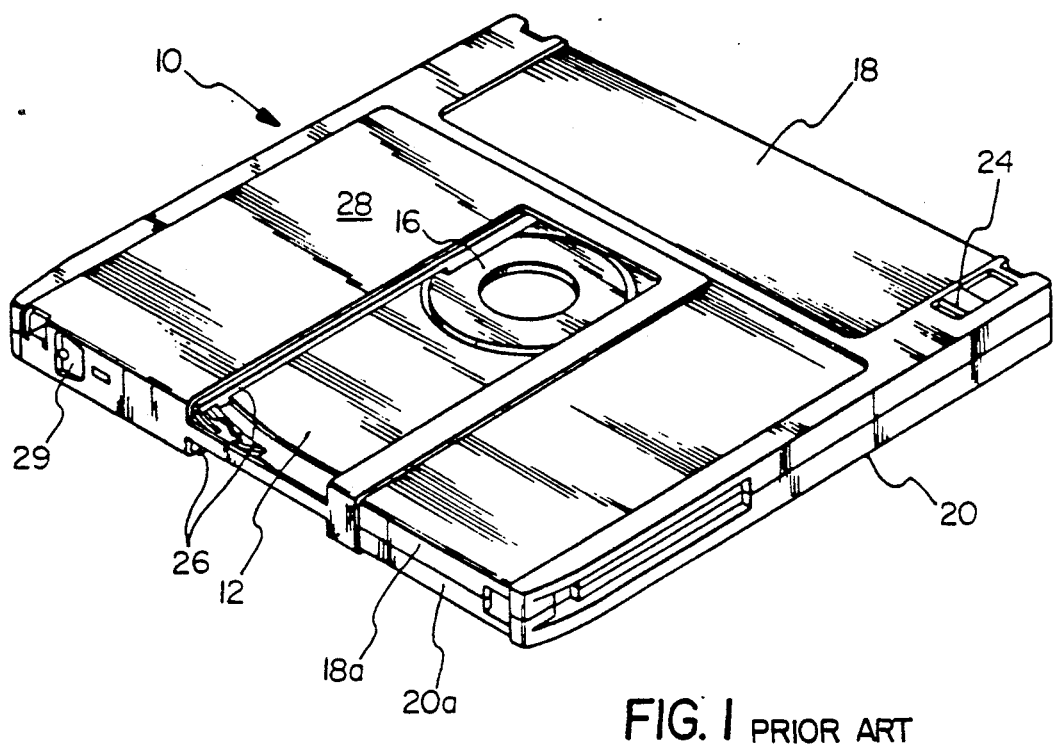
FIG. 1 is a perspective view of an information storage disk cartridge of the type for which the present invention is particularly adapted.

In FIG. 1, an information storage disk cartridge 10, with which the present invention is particularly adapted for use, includes a disk 12 adapted for recording data on, and playing data back from, a plurality of data recording tracks encircling a central hub-drive region 16 of the disk. Preferably, the recording surface of the disk is comprised of magneto-optical or optical recording media although strictly magnetic recording media might also be used. Cartridge 10 comprises a top plate 18 and a bottom plate 20 composed of a material to provide structural rigidity. Preferably, both plates 18 and 20 are plastic and are formed by a commercially available injection molding operation.

The top plate 18 and bottom plate 20 may be of any standard size to permit rotatable movement of the disk 12 therebetween about a central axis of rotation. To that end, each plate 18, 20 has an integral peripheral lip 18a, 20a, respectively, cooperatively forming a surrounding peripheral wall which serves to space the lower surface of top plate 18 from the upper surface of bottom plate 20 thus defining a generally enclosed rigid compartment in which the disk 12 is contained for rotatable movement. A write protection device, indicated generally by reference numeral 24, is located near a corner of the cartridge where it does not interfere with the disk 12.

An aligned pair of elongate access openings 26 is provided in cartridge 10 to permit operational access to the data recording tracks of disk 12 when the cartridge is operatively loaded into a disk drive system. Access openings 26 preferably are extended to encompass the central hub region 16 of disk 12, at least in the top plate 18, so as to provide for access by a disk clamp mechanism. A spring-biased generally U-shaped shutter 28 serves for automatically covering the access openings 26 to protect the disk 12 from adverse external effects such as dirt, lint, fingerprints and the like, when cartridge 10 is removed from the disk drive system. For this purpose, shutter 28 is mounted for slidable movement laterally along the front peripheral wall between a normally closed position in which access openings 26 are covered and the fully open position, illustrated in FIG. 1, in which access openings 26 are uncovered to expose a segment of recording tracks on disk 12 and also the central hub region 16. A notch 29 is formed in the forward edge of shutter 28 and serves as a point of engagement by a shutter opening lever, described in greater detail later, to cause the opening of shutter 28 as it is inserted into a disk storage system.

Figure 2:
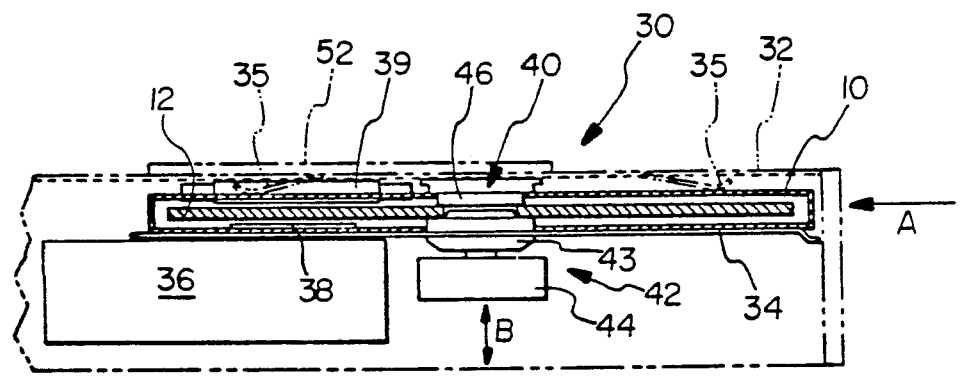
FIG. 2 is a side schematic view of an information storage disk drive system useful in describing the present invention.

Referring to FIG. 2, there is schematically represented an information storage disk drive system 30 of the type contemplated by the present invention which includes upper and lower cartridge guide plates 32, 34 adapted to receive cartridge 10 along an insertion path, represented by arrow A. Spring fingers 35 may be provided on upper guide plate 32 to urge cartridge 10 firmly against lower guide plate 34. When cartridge 10 is inserted in this manner into disk drive system 30, disk 12 slides between a read/write head 36 with its objective lens 38 positioned below disk 12 and a disk clamp 40 and an electromagnetic bias coil 39 positioned above disk 12. For optimum performance of the record/playback function, it is preferred that the objective lens 38 and the bias coil 39 be as close as possible to the surface of the disk 12, without touching, and a spacing of about 1–2 millimeters is typical. Similarly, it is desirable to have the disk clamp 40 close to the disk surface without any disk-axial movement of the clamp as the cartridge is inserted. As a result, the objective lens 38, disk clamp 40 and bias coil 39 are nested in lower and upper access openings 26, respectively, of cartridge 10 both as the cartridge is being inserted and when the cartridge is in its final operative position shown in FIG. 2.

Drive system 30 also includes a spindle-drive 42, comprised of spindle chuck 43 and spindle drive motor 44, reciprocally translatable in the direction of double arrow B between upper and lower positions by a lift/retract mechanism (not shown). In the lower position, spindle-drive 42 is retracted to a position below the level of lower guide plate 34 to allow insertion and removal of cartridge 10 from disk drive system 30. In its upper position, as illustrated in the drawing, drive chuck 43 is lifted to bring its upper drive surface into engagement with the lower surface of disk 12 at the central hub region 16 and, together with drive motor 44, serves to rotationally drive disk 12 during read/write operation of the system. When cartridge 10 is fully inserted, as shown, disk clamp 40 is positioned above central hub region 16. Clamp 40 preferably includes an axially movable magnet 46 adapted to be attracted to the magnetic material of spindle-drive 42 when the latter is lifted into engagement with disk 12, the magnetic attraction providing the necessary clamping force to hold disk 12 firmly on the drive surface of drive chuck 43. Clamp 40 and bias coil 39 are preferably attached to a retractable clamp mounting plate 52 slidably mounted on upper guide plate 32. As will be explained in more detail later, mounting plate 52 is horizontally retractable toward the rear of drive 30 as cartridge 10 is removed so as to avoid interference between clamp 40 and the opening and closing of shutter 28 as cartridge 10 is loaded and unloaded from the drive system. As previously indicated, clamp 40 is fixed in the axial direction of disk 12 and thus the forward sliding motion of plate 52 results in the nesting of clamp 40 in upper aperture 26 as cartridge 10 is inserted into disk drive system 30 after shutter 28 is opened as will be explained in greater detail later.

Figure 3:
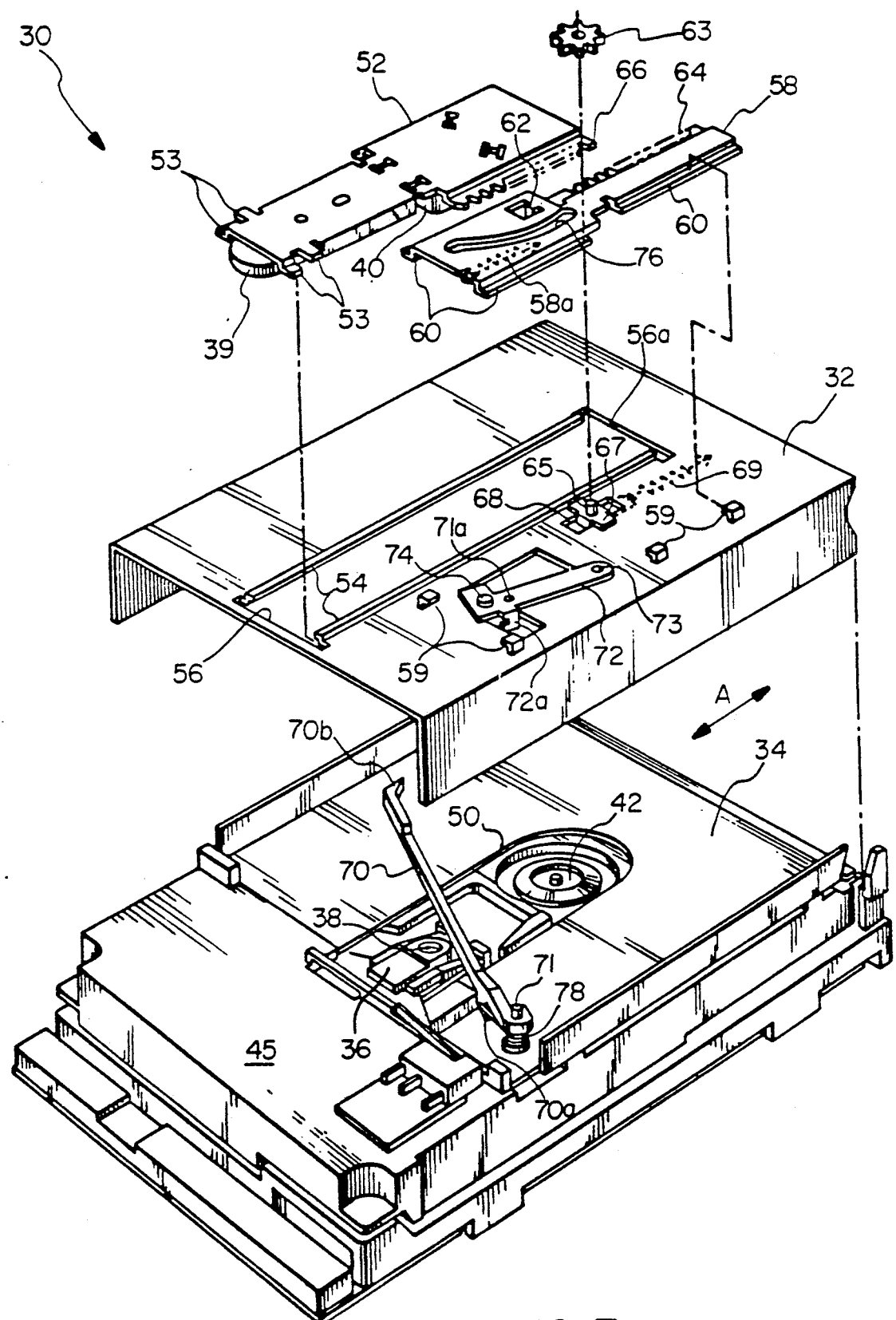
FIG. 3 is an exploded perspective view of a cartridge load mechanism embodying shutter opening apparatus according to the present invention.

Referring now to FIG. 3, shutter opening apparatus of the invention is shown for the load mechanism of a disk drive system. To this end guide means for receiving disk cartridge 10 along an insertion path (double arrow A) and for holding the cartridge in its plane of insertion includes lower guide plate 34 and upper guide plate 32, the latter also serving as a cover for the cartridge loading portion of the disk drive system. Lower guide plate 34 is mounted on a skirted central mounting plate 45 which houses the read/write head 36 and various drive components of the disk drive system 30. Lower guide plate 34 is provided with an elongated aperture 50 through which objective lens 38, of read/write head 36, and spindle-drive 42 project via respective apertures in central mount plate 45 to provide access to the storage disk when a cartridge has been inserted. Bias coil 39 and disk clamp 40 are secured to the underside of retractable clamp mounting plate 52 slidably mounted on upper guide plate 32 by a plurality of tabs 53 captured onto the side rails 54 of an elongated slot opening 56 formed in the upper guide plate 32. Mount plate 52 is arranged to slide from a rear position in slot 56 (left, as viewed in the drawing) to a forward position (right, in the drawing) as cartridge 10 is inserted into the disk drive system and to retract in the reverse direction when the cartridge is removed. When mount plate 52 is in its forward position, the forward edge of clamp 40 abuts the forward end 56a of slot 56 thus providing precise, firm positioning of clamp 40.

The mechanism for causing mount plate 52 to slide forward when a cartridge is inserted includes drive cam 58 slidably mounted on the top surface of upper guide plate 32 by means of side rails 60 captured in holding tabs 59. Drive cam 58 is provided with a downwardly depending drive tab 62 adapted to be engaged by the leading edge of cartridge 10 during insertion into the disk drive system. Drive cam 58 is drivingly coupled to mount plate 52 by means of a double rack and pinion arrangement comprised of pinion 63 engaged between parallel racks 64,66 formed on the sides of drive cam 58 and mount plate 52, respectively. Pinion 63 is preferably compliantly mounted between racks 64,66 via pin 65 formed on a bracket 67 which is slidably mounted in slot 68 and biased forwardly by means of tension spring 69 having its forward end attached by suitable means to upper guide plate 32. When no cartridge is in position in the guide means of disk drive system 30, mount plate 52 is held in its retracted position by drive cam 58 which is biased forwardly by a tension spring 58a having its forward end attached to upper guide plate 32 by suitable means.

Figure 4:
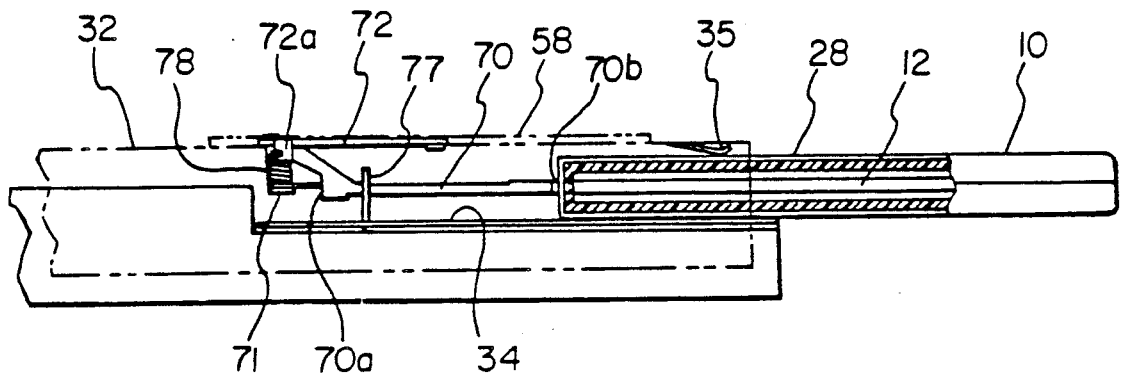
FIG. 4 is a cutaway side view of the shutter opening apparatus of FIG. 3.
Figure 5:
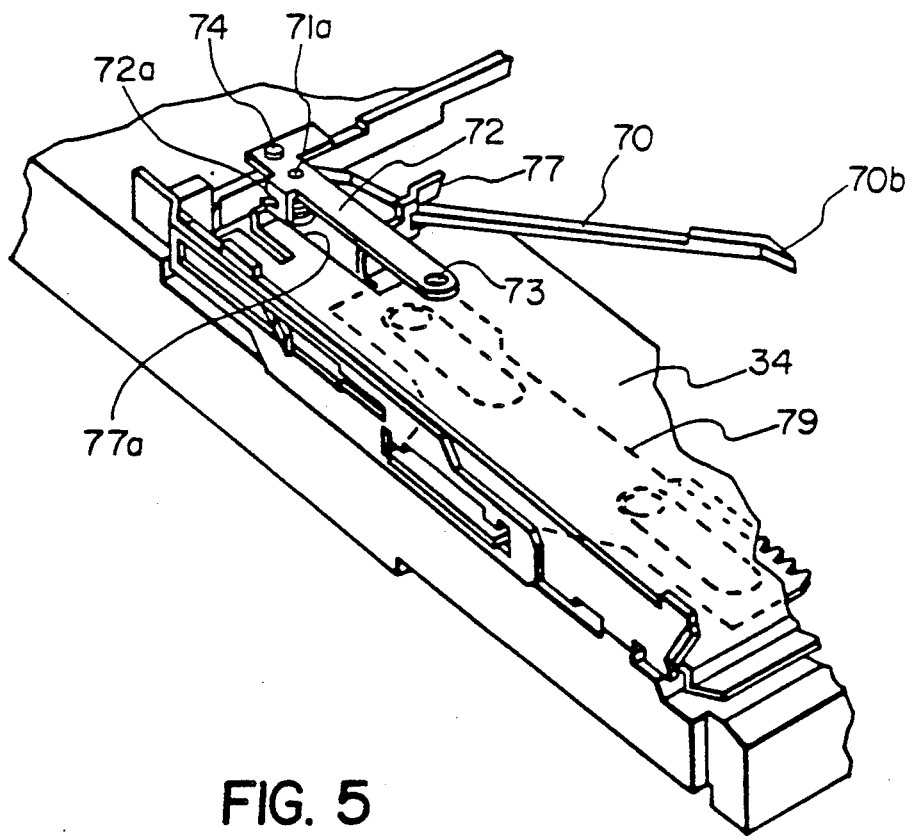
FIG. 5 is a partial perspective view of the shutter opening apparatus of FIG. 3.

In accordance with a feature of the invention and with reference jointly to FIGS. 3-5, rapid opening of shutter 28 on cartridge 10 (FIG. 1) is achieved after the cartridge has been inserted sufficiently to assure protection for the enclosed disk by means of a pivotable shutter opening lever 70 positioned in the guide means between upper and lower guide plates 32,34. Lever 70 is mounted on a movable pivot pin 71 journalled in hole 71a near the end of a pivotable mounting arm 72. Arm 72 is pivotably mounted at 73 on the top surface of upper guide plate 32 beneath a raised section of drive cam 58. Arm 72 is also provided with a follower pin 74 which rides in a curved slot 76 formed in drive cam 58. Shutter opening lever 70 is urged forwardly by a bias spring 78 mounted concentrically on pivot pin 71 with one end held in a notch 70a on lever 70 and the other end in a notched tab 72a on pivotable mounting arm 72. When biased forward with no cartridge loaded in the guide means, lever 70 is preferably held in a notched tab 77 formed on a sliding bracket 79 positioned underneath plate 34 and projecting upwards through a slot 77a in lower guide plate 34.

Lever 70 is provided with a pointed end 70b comprising a shutter engaging member adapted to engage the shutter in notch 29 (FIG. 1) as the cartridge is inserted into the disk drive. Lever 70 is preferably no thicker than the thickness of disk 12 and is held by notched tab 77 in the same plane as disk 12 so as not to interfere with objective lens 38 (FIG. 3) or with clamp 40 and bias coil 39 (FIG. 2). Additionally, notched tab 77 is adapted to hold lever 70 at an angle crosswire of the guide means with lever end 70b being so positioned in the guide means as to engage the cartridge shutter at an angle to insure that lever 70 will pivot laterally and not bind as the cartridge continues in the insertion direction. This also insures that if lever end 70b is not initially aligned with notch 29, it will positively move laterally to seat in notch 29. Additionally, the length of lever 70 and the initial positioning of pivot 71 is selected to insure that lever end 70b will engage notch 29 only after the cartridge has been inserted to a point at which at least the recording tracks exposed by the cartridge access opening 26 and preferably also the central hub region 16 of disk 12 are substantially within the disk drive system.

Figure 6A:
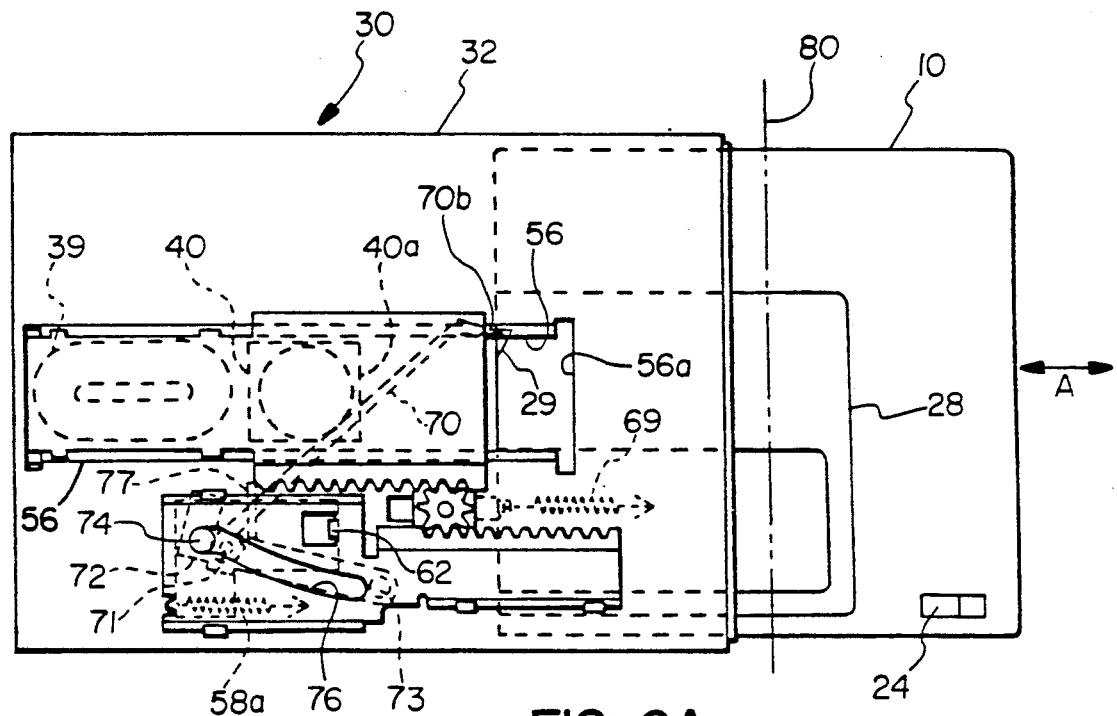
FIGS. 6A–6C are top plan views of the FIG. 3 shutter opening apparatus illustrating the operation thereof.
Figure 6B:
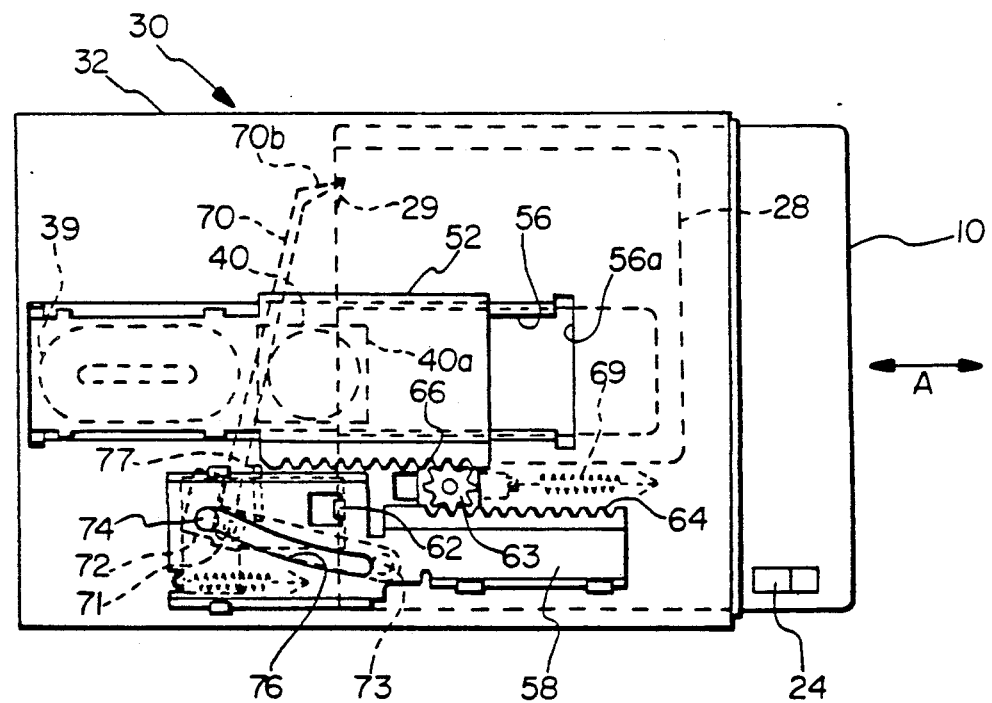
Figure 6C:
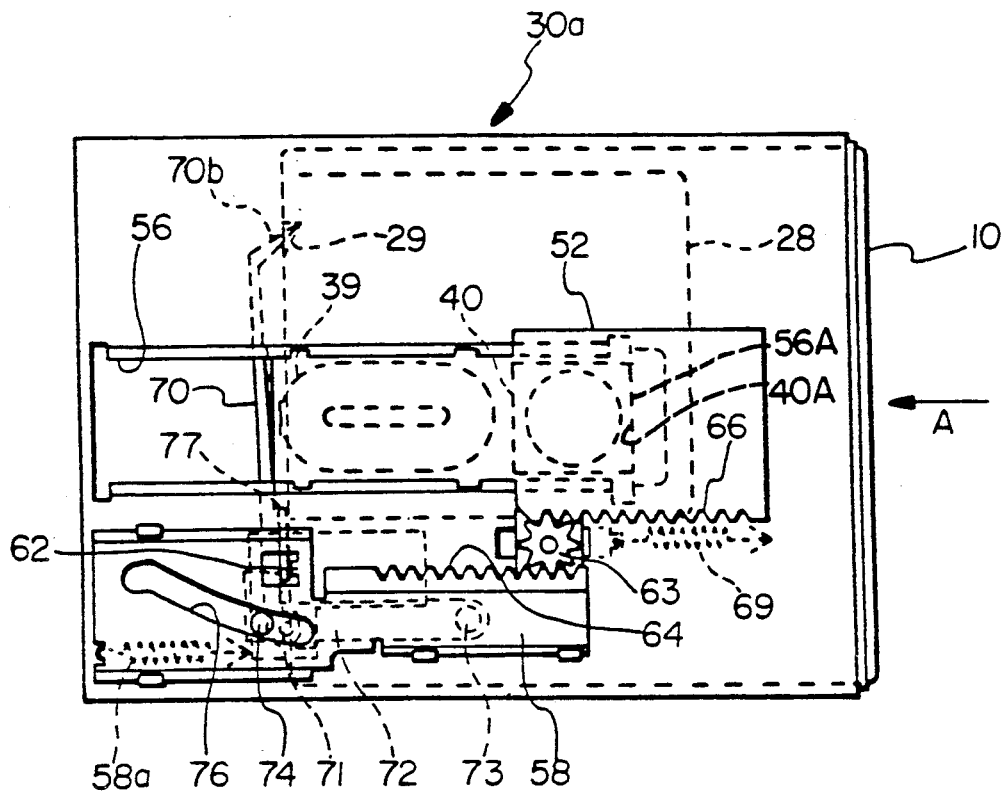

With reference to FIGS. 6A-6C, the operation of the shutter opening apparatus of the invention will now be considered. Assuming a cartridge 10 is being inserted into the disk drive system, when the cartridge reaches the point at which shutter notch 29 is engaged by lever end 70b of shutter opening lever 70 (FIG. 6A), it will be seen that nearly half of the cartridge is within the disk drive with the shutter 28 still closed. Thus the segment of recording tracks to be exposed when the shutter is later opened remain protected from accidental contact by the user during insertion. It will be appreciated that only the internal mechanism of the drive system is shown in the drawings. When considering the added dimension provided by the cabinet within which the drive system is mounted, as represented by phantom line 80, most, if not all, of the enclosed disk is protected from accidental contact at this point as shutter 28 begins to open.

As the user continues to push the cartridge into the drive system, lever 70 pivots laterally with lever end 70b captured in shutter notch 29 causing shutter 28 to be forced laterally in the opening direction (upward in the drawing). By the time cartridge 10 is inserted to the point shown in FIG. 6B at which the leading edge of the cartridge reaches the retracted clamp 40 on mount plate 52, lever 70 has pivoted to the point at which shutter 28 is fully open thus clearing the way for mount plate 52 to be brought forward with clamp 40 and bias coil 39 nested in the upper access aperture 26 of cartridge 10. At the same time, as cartridge 10 is inserted to its final operative position, the rapid opening of the shutter allows the read/write head (which is normally stationary during the insertion process) to nest in the lower access aperture 26 during the final insertion phase.

Because shutter 28 is fully opened at this intermediate stage in the cartridge insertion (FIG. 6B), notch 29 is fixed in the lateral direction which prevents opening lever 70 from continuing to pivot. To prevent the binding which would otherwise result from this condition, lever 70 enters a second stage of its operation in which pivot 71 is moved by the action of the cam slot 76 on follower 74 to pivot the mounting arm 72 laterally in the opposite direction to the opening motion of shutter 28. The curve of slot 76 is chosen to allow the pivot 71 of opening lever 70 to move laterally by an amount sufficient to allow lever end 70b to translate along a linear path in a direction parallel to the direction of insertion of the cartridge as it approaches its final operative position as shown in FIG. 6C.

When the cartridge 10 is removed, the process is reversed. As drive cam 58 moves back (to the right in the drawing) aided, at least in part, by the restoring force of spring 58a, mount plate 52 is driven rearward toward the retracted position by action of double rack and pinion 63,64,66. Simultaneously, pivot 71 moves laterally (upward in the drawing) by an amount sufficient to maintain lever end 70b in a linear path as lever 70 pivots forward. When cartridge 10 reaches the end of this initial removal stage (FIG. 6B), shutter 28 is free to be closed without interfering sith clamp 40 or objective lens 38. Follower 74 has also reached the end of cam slot 76 thus fixing pivot 71 in place. Thereafter, with continued removal of cartridge 10, the pivoting of lever 70 causes lever end 70b to move in an arc which allows shutter 28 to close under the restoring force of the shutter spring in cartridge 10.

A particular advantage of this preferred embodiment of the invention lies in the fact that the lateral motion of pivot 71 during the second stage of cartridge insertion (and correspondingly the first stage of cartridge removal) obviates the need to provide space toward the rear of the drive system to accommodate any rearward motion of the shutter opening apparatus, thus allowing the available space to be used for other purposes such as electronic controller components.

Figure 7C:
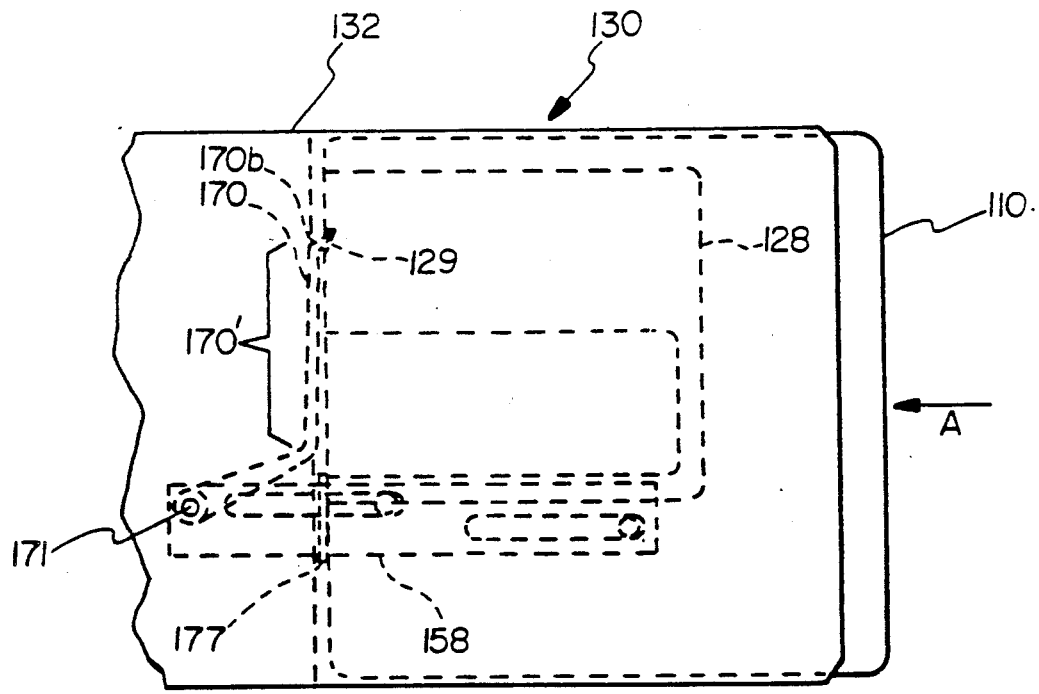
FIGS. 7A–7C are top plan views of an alternative embodiment of shutter opening apparatus the invention illustrating the operation thereof.
Figure 7A:
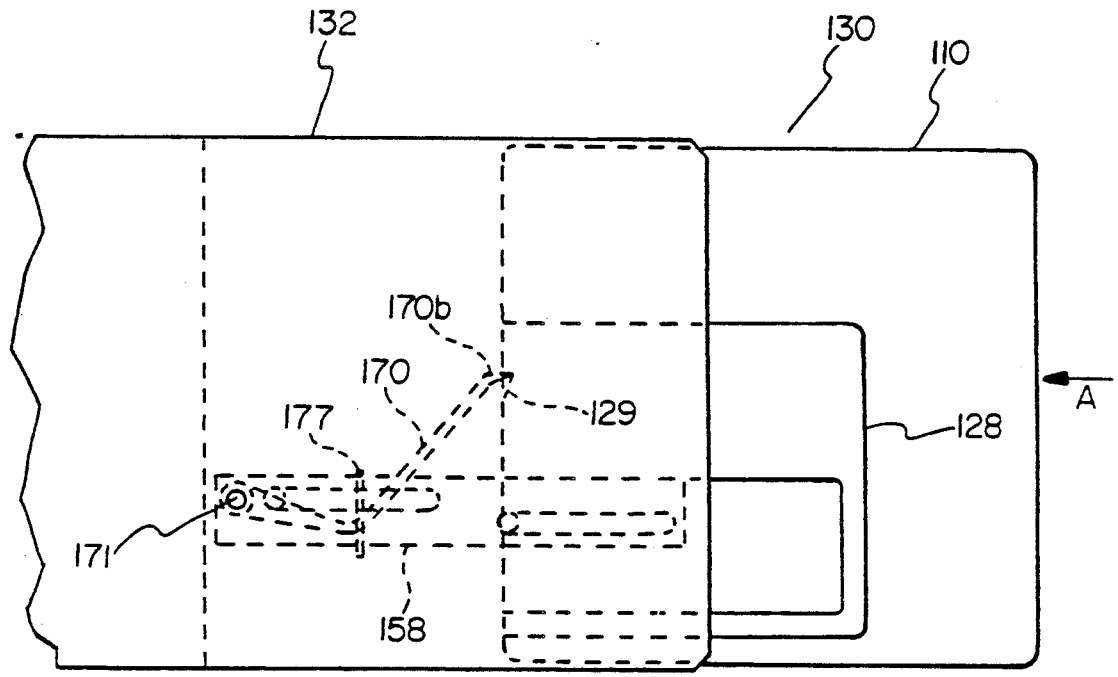
Figure 7B:
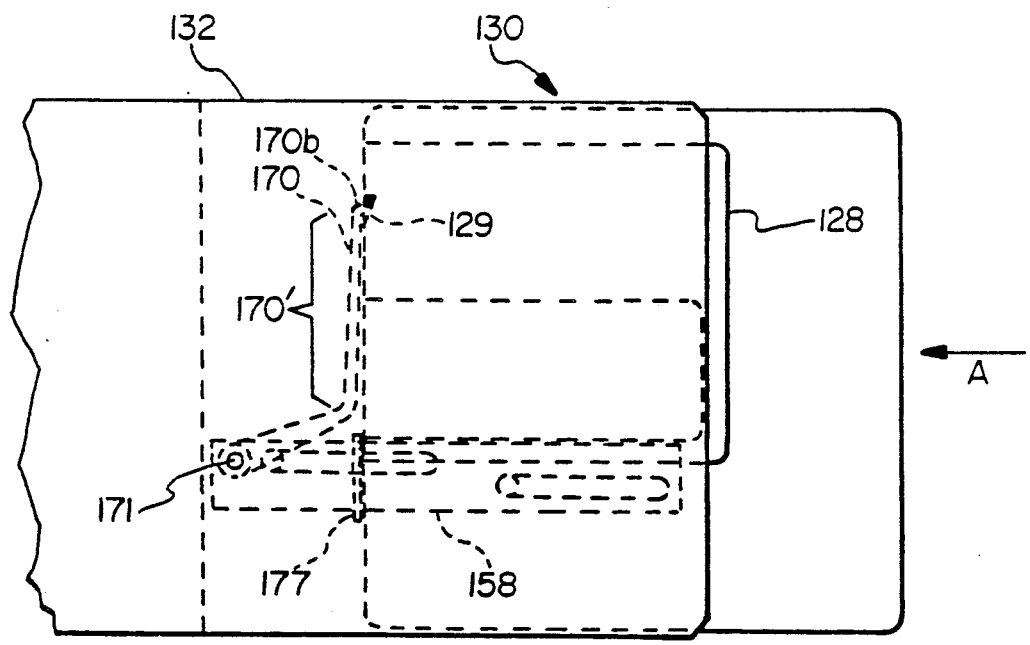

Referring now to FIGS. 7A-7C, there is shown an alternative embodiment of the invention with components functionally similar to those of the previously described preferred embodiment bearing the same reference number preceded by the numeral 1. In FIG. 7A, a cartridge 110 is shown inserted to a point at which notch 129 of shutter 128 is engaged by lever end 170b of a bent shutter opening lever 170. Lever 170 is held by a support tab 177 formed on a slide plate 172 under a lower guide plate (not shown) similar to the guide plate 34 of FIG. 3. As was the case with the previously described embodiment, cartridge 110 is in the disk drive system 130 far enough so that at least the recorded tracks and preferably also the central hub region of the disk will be protected by being inside the guide means and the enclosing cabinet when the shutter 128 commences opening. As the cartridge continues in the insertion direction, lever 170 pivots laterally until, as shown in FIG. 7B, shutter 128 is fully open with forward bent segment 170' parallel with the leading edge of cartridge 110. Although not illustrated in these views, the disk clamp, bias coil and read/write head components included in drive system 130, similar to the corresponding components of drive system 30 of FIG. 3, are now free to nest with the access apertures of cartridge 110 as the cartridge continues in its insertion. At the beginning of the second stage of operation, with the shutter fully open, the leading edge of cartridge 110 engages support tab 177 attached to slide plate 158 forcing slide plate 158 to the rear carrying with it pivot 171 of the shutter opening lever 170 until cartridge 110 is fully inserted, as shown in FIG. 7C. As a consquence of the movement of pivot 171 directly rearward in a path parallel to the insertion path of cartridge 110 (arrow A), the arcuate movement of lever end 170b during the first stage of operation of lever 170 is converted to linear translation in a manner similar to the operation of lever 70 and lever end 70b of the embodiment of FIG. 3.

The invention has been described in detail with particular reference to a presently preferred embodiment, but it will be understood that variations and modifications can be effected within the spirit and scope of the invention.

What is claimed is:

1. In an information storage disk drive system having a cartridge insertion guide means for receiving a disk cartridge including a disk along an insertion path and for holding said cartridge in its own plane of insertion when in a final operative position, the cartridge having a shutter movable laterally to uncover a disk access aperture in the cartridge which exposes a radial segement of recording tracks on said disk, the drive system including one or more of optical read/write head, electromagnetic bias coil and disk hub clamp components positioned between the guide means and below the cartridge insertion path and adapted to be nested in said access aperture when the cartridge is in its final operative position, shutter opening apparatus comprising:

a pivotable shutter opening lever positioned in the guide means, said lever having a shutter engaging member adapted to engage the shutter when the cartridge has been inserted to a point at which at least the disk recording tracks segment is substantially within said guide means and further adapted to pivot laterally and open said shutter sufficiently as said cartridge is inserted to a point along said insertion path at which said cartridge encounters any of said components whereby said shutter clears said components and allows said components to nest within said access aperture as the cartridge is continued to be inserted toward its final operative position.

2. Shutter opening apparatus of claim 1 further including a movable pivot, upon which said pivotable shutter opening lever is mounted, said movable pivot adapted to be moved when the shutter is fully opened to allow said shutter engaging member to translate along a linear path in a direction parallel to the direction of insertion of said cartridge.

3. Shutter opening apparatus of claim 1 wherein said lever includes a movable pivot, said apparatus further comprising a pivotable mounting arm having a fixed pivot point secured to said guide means, said lever movable pivot being secured to a movable point on said mounting arm, and means operative as the cartridge moves along the insertion path with the cartridge shutter fully open for causing said movable pivot to translate in a lateral direction by an amount sufficient to permit continued pivoting of the shutter opening lever as the shutter engaging member translates along a linear path parallel with the direction of movement of the cartridge.

4. In an information storage disk drive system, cartridge loading apparatus adapted to receive a disk cartridge having a shutter movable laterally to uncover a disk access aperture in the cartridge which exposes a radial segment of recording tracks on said disk, said apparatus comprising:

cartridge insertion guide means for receiving said disk cartridge along an insertion path and for holding said cartridge in its plane of insertion when in a final operative position;

at least one component from the group of an optical read/write head, an electromagnetic bias coil and a disk hub clamp being positioned between the guide means and below the cartridge insertion path so as to be nested in said access aperture when the cartridge is in its final operative position; and a pivotable shutter opening lever positioned in the guide means, said lever having a shutter engaging member adapted to engage the shutter when the cartridge has been inserted to a location along said insertion path at which the disk recording track segment is substantially within said guide means and adapted to pivot laterally to open said shutter sufficiently by the location along said insertion path at which said cartridge encounters any of said components so as to clear said components and allow said components to nest within said access aperture as the cartridge is continued to be inserted toward its final operative position.

5. Cartridge loading apparatus according to claim 4 further comprising
a movable pivot, said lever being mounted on said pivot;
means for moving said movable pivot when said cartridge is moved along the insertion path beyond the point at which the shutter is fully open to allow said shutter engaging member to translate along a linear path in a direction parallel to the insertion path of said cartridge.

6. Cartridge loading apparatus according to claim 4 further comprising
a pivotable mounting arm having a fixed pivot point secured to said guide means;
said shutter opening lever including a movable pivot secured to a movable point on said mounting arm; and
means operative as the cartridge moves along the insertion path with the cartridge shutter fully open for causing said movable pivot to translate in a lateral direction by an amount sufficient to permit continued pivoting of the shutter opening lever while the shutter engaging member translates along a linear path parallel with the direction of movement of the cartridge.

7. In an information storage disk drive system having a cartridge insertion guide means for receiving a disk cartridge along an insertion path and for holding said cartridge in its own plane of insertion when in a final operative position, the cartridge containing a disk and having a shutter movable laterally to uncover a disk access aperture in the cartridge which exposes a radial segment of recording tracks on said disk, the drive system including a disk access component positioned within the guide means in the cartridge insertion path and adapted to be nested in said access aperture when the cartridge is in its final operative position, shutter opening apparatus comprising:

a pivotable shutter opening lever positioned in the guide means and mounted on a first pivot, said lever having a shutter engaging member adapted to engage the shutter when the cartridge has been inserted to a point at which at least the disk recording track segment substantially within said guide means and further adapted to pivot laterally about the first pivot and open said shutter sufficiently by a position along said insertion path at which said cartridge encounters the disk access component so that the shutter is clear of the disk access component and allows the disk access component to move into and nest within said access aperture as the cartridge is continued to be inserted toward its final operative position.

8. Shutter opening apparatus of claim 7 wherein the first pivot is adapted to be moved when the shutter is fully opened to allow said shutter engaging member to translate along a linear path in a direction parallel to the direction of insertion of said cartridge.

9. Shutter opening apparatus of claim 7 and further comprising:
a pivotable mounting arm having a fixed second pivot point secured to said guide means, the first pivot being secured to a movable point on said mounting arm, and
means operative as the cartridge moves along the insertion path with the cartridge shutter fully open for causing the first pivot to translate in a lateral direction by an amount sufficient to permit continued pivoting of the shutter opening lever as the shutter engaging member translates along a linear path parallel with the directon of movement of the cartridge.

10. In an information storage disk drive system, cartridge loading apparatus adapted to receive a disk cartridge containing a disk and having a shutter movable laterally to uncover a disk access aperture in the cartridge which exposes a radial segment of recording tracks on said disk, said apparatus comprising:

cartridge insertion guide means for receiving said disk cartridge along an insertion path and for holding said cartridge in its plane of insertion when in a final operative position;

at least one component from the group of an optical read/write head, an electromagnetic bias coil and a disk hub clamp being positioned within the guide means in the cartridge insertion path so as to be nested in said access aperture when the cartridge is in its final operative position;

a pivotable shutter opening lever positioned in the guide means and mounted on a first pivot, said lever having a shutter engaging member adapted to engage the shutter when the cartridge has been inserted to a point at which the disk recording track segment is substantially within said guide means and adapted to pivot laterally about the first pivot to open said shutter sufficiently by a position along said insertion path at which said cartridge encounters any of said components so that the shutter is clear of said components and allows said components to move into and nest within said access aperture as the cartridge is continued to be inserted toward its final operative position.

11. Cartridge loading apparatus according to claim 10 and further comprising:

means for moving the first pivot when said cartridge is moved along the insertion path beyond the point at which the shutter is fully open to allow said shutter engaging member to translate along a linear opath in a direction parallel to the insertion path of said cartridge.

12. Cartridge loading apparatus according to claim 10 further comprising:

a pivotable loading apparatus according to claim 10 further comprising:

a pivotable mounting arm having a fixed second pivot point secured to said guide means;

the first pivot being secured to a movable point on said mounting arm; and means operative as the cartridge moves along the insertion path with the cartridge shutter fully open for causing the first pivot to translate in a lateral direction by an amount sufficient to permit continued pivoting of the shutter opening lever while the shutter engaging member translates along a linear parallel with the direction of movement of the cartridge.

* * * * *

UNITED STATES PATENT AND TRADEMARK OFFICE
CERTIFICATE OF CORRECTION

PATENT NO.    : 5,111,350
DATED         : May 5, 1992
INVENTOR(S)   : JAMES R. CAREY: DAVID L. ROWDEN

It is certified that error appears in the above-identified patent and that said Letters Patent is hereby corrected as shown below:

Col. 11, line 10, delete "opath", insert "path"

Signed and Sealed this

Twenty-ninth Day of June, 1993

Attest:

MICHAEL K. KIRK

Attesting Officer    Acting Commissioner of Patents and Trademarks